United States Patent
Takahashi

(10) Patent No.: US 12,456,891 B2
(45) Date of Patent: Oct. 28, 2025

(54) FIELD MAGNETON

(71) Applicant: DENSO CORPORATION, Kariya (JP)

(72) Inventor: Yuki Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 246 days.

(21) Appl. No.: 18/458,623

(22) Filed: Aug. 30, 2023

(65) Prior Publication Data

US 2023/0412022 A1 Dec. 21, 2023

Related U.S. Application Data

(63) Continuation of application No. PCT/JP2022/007723, filed on Feb. 24, 2022.

(30) Foreign Application Priority Data

Mar. 1, 2021 (JP) ................. 2021-032025

(51) Int. Cl.
*H02K 1/27* (2022.01)
*H02K 1/278* (2022.01)
*H02K 21/14* (2006.01)

(52) U.S. Cl.
CPC ........... *H02K 1/278* (2013.01); *H02K 21/145* (2013.01); *H02K 2213/03* (2013.01)

(58) Field of Classification Search
CPC .................................................. H02K 2213/03
See application file for complete search history.

(56) References Cited

U.S. PATENT DOCUMENTS

| | | | |
|---|---|---|---|
| 2020/0161939 A1 | 5/2020 | Takahashi et al. | |
| 2020/0162003 A1 | 5/2020 | Takahashi et al. | |
| 2020/0328639 A1 | 10/2020 | Takahashi | |
| 2020/0336031 A1* | 10/2020 | Takahashi | H02K 1/165 |
| 2020/0336033 A1 | 10/2020 | Takahashi | |
| 2022/0006356 A1 | 1/2022 | Takahashi et al. | |
| 2022/0006357 A1 | 1/2022 | Takahashi et al. | |
| 2022/0006358 A1 | 1/2022 | Takahashi et al. | |
| 2022/0014074 A1 | 1/2022 | Takahashi et al. | |
| 2022/0014075 A1 | 1/2022 | Takahashi et al. | |
| 2022/0045578 A1 | 2/2022 | Takahashi et al. | |

FOREIGN PATENT DOCUMENTS

| | | |
|---|---|---|
| JP | 2007-068270 A | 3/2007 |
| JP | 2007-150194 A | 6/2007 |
| JP | 2013-066345 A | 4/2013 |
| JP | 2013-106499 A | 5/2013 |

* cited by examiner

*Primary Examiner* — Oluseye Iwarere
*Assistant Examiner* — Masoud Vaziri
(74) *Attorney, Agent, or Firm* — Maschoff Brennan

(57) ABSTRACT

A field magneton constitutes a rotating electric machine including an armature having an armature winding and is arranged radially facing the armature. The field magneton includes a magnet having a plurality of magnetic poles with alternating polarities in a circumferential direction. The magnet is oriented so that a direction of an axis of easy magnetization on a d-axis side, which is a magnetic pole center, is closer to a direction of the d-axis than the direction of the axis of easy magnetization on a q-axis side, which is a magnetic pole boundary. In the magnet, a coefficient of linear expansion in the direction of the axis of easy magnetization is different from the coefficient of linear expansion in the direction perpendicular to the axis of easy magnetization.

8 Claims, 7 Drawing Sheets

_FIELD MAGNETON_

CROSS REFERENCE TO RELATED APPLICATIONS

This application is a continuation application of International Patent Application No. PCT/JP2022/007723 filed on Feb. 24, 2022, which designated the U.S. and based on and claims the benefits of priority of Japanese Patent Application No. 2021-032025 filed on Mar. 1, 2021. The entire disclosure of all of the above applications is incorporated herein by reference.

TECHNICAL FIELD

The present disclosure relates to a field magneton that constitutes a rotating electric machine.

BACKGROUND

In a rotating electric machine including an armature having armature windings, there is known a field magneton that is arranged so as to face the armature in a radial direction.

SUMMARY

A field magneton constitutes a rotating electric machine including an armature having an armature winding, and is arranged radially facing the armature. The field magneton includes a magnet having a plurality of magnetic poles with alternating polarities in a circumferential direction. The magnet is oriented so that a direction of an axis of easy magnetization on a d-axis side, which is a magnetic pole center, is closer to a direction of the d-axis than the direction of the axis of easy magnetization on a q-axis side, which is a magnetic pole boundary. In the magnet, a coefficient of linear expansion in the direction of the axis of easy magnetization is different from the coefficient of linear expansion in the direction perpendicular to the axis of easy magnetization.

BRIEF DESCRIPTION OF DRAWINGS

The above and other objects, features and advantages of the present disclosure will become more apparent from the following detailed description when taken in conjunction with the accompanying drawings. In the drawings.

DETAILED DESCRIPTION

Figure 1:
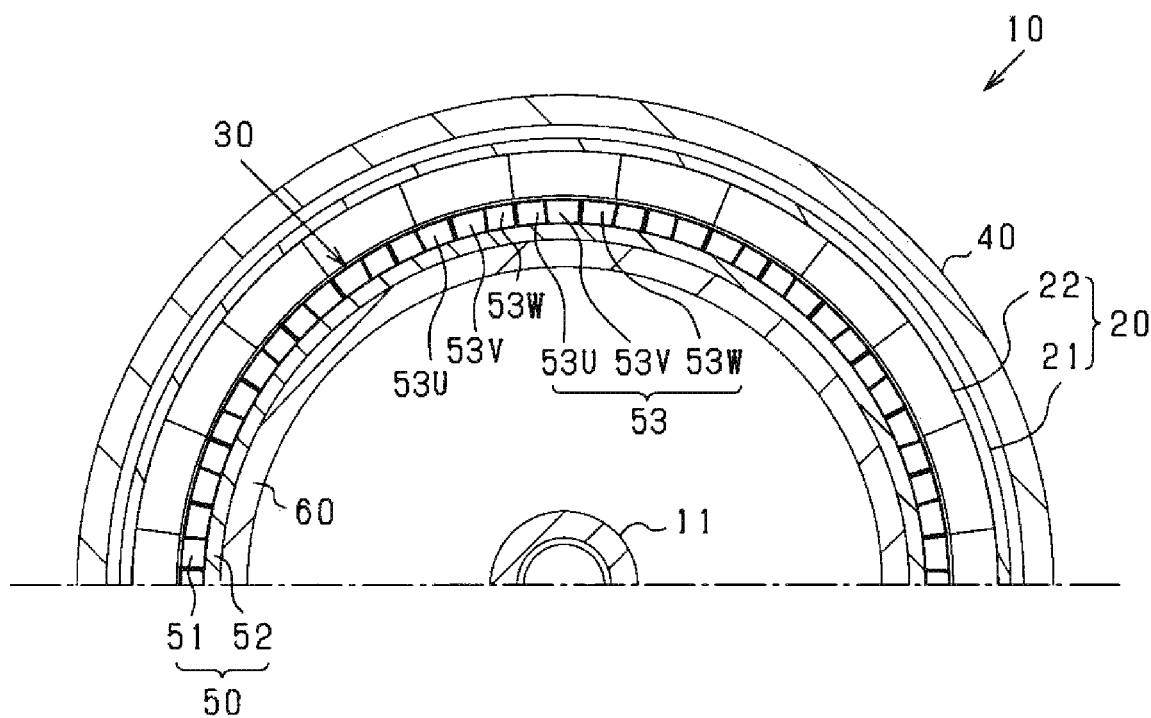
FIG. 1 is a longitudinal sectional view of a rotating electric machine according to a first embodiment.

In a rotating electric machine including an armature having armature windings, there is known a field magneton that is arranged so as to face the armature in a radial direction. For example, there is known a rotor in which the field magneton is used as a surface magnet type rotor.

Due to temperature changes in the magnets of the field magneton, the dimensions of the magnets can change in a circumferential direction. As a result, there is concern that thermal stress may be applied to the magnet.

The present disclosure has been made in view of the circumstances described above, and a main object thereof is to provide the field magneton capable of reducing thermal stress applied to the magnet.

In means 1, a field magneton constitutes a rotating electric machine including an armature having an armature winding, and is arranged radially facing the armature. The field magneton includes a magnet having a plurality of magnetic poles with alternating polarities in a circumferential direction. The magnet is oriented so that a direction of an axis of easy magnetization on a d-axis side, which is a magnetic pole center, is closer to a direction of the d-axis than the direction of the axis of easy magnetization on a q-axis side, which is a magnetic pole boundary. In the magnet, a coefficient of linear expansion in the direction of the axis of easy magnetization is different from the coefficient of linear expansion in the direction perpendicular to the axis of easy magnetization.

According to means 1, in the magnet, a coefficient of linear expansion in the direction of the axis of easy magnetization is different from the coefficient of linear expansion in the direction perpendicular to the axis of easy magnetization. In this case, since the magnet is oriented so that the direction of the easy axis of magnetization on the d-axis side is closer to the direction of the d-axis side than the direction of the easy axis of magnetization on the q-axis side, the coefficient of linear expansion on the d-axis side and the coefficient of linear expansion on the q-axis side are different in the circumferential direction. For this reason, dimensional change in the circumferential direction due to temperature change of the magnet are different on the d-axis side of the magnet and on the q-axis side of the magnet. Therefore, it is possible to suppress the change in the dimension of the magnet as a whole in the circumferential direction. As a result, thermal stress applied to the magnet can be reduced.

In means 2 according to means 1, in the magnet, a coefficient of linear expansion in the direction of the axis of easy magnetization is positive, and the coefficient of linear expansion in the direction perpendicular to the axis of easy magnetization is negative.

According to means 2, the higher the temperature of the magnet, the smaller the dimension in the circumferential direction on the d-axis side and the larger the dimension in the circumferential direction on the q-axis side. On the other hand, the lower the temperature of the magnet, the larger the dimension in the circumferential direction on the d-axis side and the smaller the dimension in the circumferential direction on the q-axis side. Therefore, it is possible to suitably suppress the change in the dimension of the magnet as a whole in the circumferential direction.

In means 3 according to means 2, the field magneton is a surface magnet type field magneton including a magnet carrier having a peripheral surface to which the magnet is attached. The magnet is composed of a plurality of divided magnets divided in the circumferential direction. The split surfaces of the divided magnets adjacent in the circumferential direction are in contact with each other.

In means 3, when a dimensional change of the magnet occurs due to a change in the temperature of the magnet, the thermal stress in the direction in which the split magnets adjacent to each other in the circumferential direction press each other or the thermal stress in the direction in which the split magnets adjacent to each other separate from each other tends to increase. In this regard, it is advantageous in that a magnet having a positive coefficient of linear expansion in the direction of the axis of easy magnetization and a negative coefficient of linear expansion in the direction perpendicular to the axis of easy magnetization can be used.

In means 4 according to means 2, the field magneton is a surface magnet type field magneton including a magnet carrier having a peripheral surface to which the magnet is attached. The magnet is composed of a plurality of divided magnets divided in the circumferential direction. A protrusion protruding radially from the magnet carrier toward the armature side and having a positive coefficient of linear expansion is provided. An end in the circumferential direction of the divided magnet is in contact with the protrusion.

In means 4, the field magneton is provided with a protrusion, for example, for positioning the divided magnet with respect to the magnet carrier. In means 4, when a dimensional change in the magnet occurs due to a change in the temperature of the magnet, the thermal stress in the direction of pressing between the divided magnet and the protrusion in the circumferential direction, or the thermal stress in the direction in which the divided magnet and the protrusion separate from each other tends to increase. In this regard, it is advantageous in that a magnet having a positive coefficient of linear expansion in the direction of the axis of easy magnetization and a negative coefficient of linear expansion in the direction perpendicular to the axis of easy magnetization can be used.

In means 5 according to any one of means 2 to 4, in the magnet, the absolute value of the coefficient of linear expansion in the direction of the axis of easy magnetization is made larger than the absolute value of the coefficient of linear expansion in the direction perpendicular to the axis of easy magnetization. An amount of dimensional change in the circumferential direction per unit temperature change in a d-axis portion of the magnet is referred to as Fd, and an amount of dimensional change in the circumferential direction per unit temperature change in a q-axis portion of the magnet is referred to as Fq. A direction of the axis of easy magnetization on the d-axis side is closer to the direction of the d-axis side than the direction of the axis of easy magnetization on the q-axis side, and the magnet is oriented so as to satisfy Equation 1.

[Equation 1]

$$0.8 \leq |Fd/Fq| < 1 \quad (a1)$$

According to means 5, in the magnet, the absolute value of the coefficient of linear expansion in the direction of the axis of easy magnetization is made larger than the absolute value of the coefficient of linear expansion in the direction perpendicular to the axis of easy magnetization. For this reason, the orientation of the magnet that concentrates the magnet magnetic flux on the d-axis, that is, the magnet is oriented so that the direction of the axis of easy magnetization on the d-axis side is closer to the direction of the d-axis side than the direction of the axis of easy magnetization on the q-axis side. As a result, the ratio represented by |Fd/Fq| is less than one. The closer this ratio is to 1, the smaller the amount of dimensional change in the circumferential direction of the magnet due to temperature change. As a result, according to means 5, it is possible to appropriately suppress the circumferential dimensional change of the magnet due to the temperature change while increasing the torque of the rotating electric machine by realizing an orientation that concentrates the magnet magnetic flux on the d-axis.

In means 6 according to means 2, the field magneton is an embedded magnet type field element including a field magneton core, in which the magnets are housed in magnet housing holes formed in the field magneton core. The magnet housing hole and the magnet extends lengthwise from the d-axis side toward the q-axis side. In the magnet, the absolute value of the coefficient of linear expansion in the direction of the axis of easy magnetization is made larger than the absolute value of the coefficient of linear expansion in the direction perpendicular to the axis of easy magnetization. An amount of dimensional change in the longitudinal direction per unit temperature change in a d-axis portion of the magnet is referred to as Gd, and an amount of dimensional change in the longitudinal direction per unit temperature change in a q-axis portion of the magnet is referred to as Gq. A direction of the axis of easy magnetization on the d-axis side is closer to the direction of the d-axis side than the direction of the axis of easy magnetization on the q-axis side, and the magnet is oriented so as to satisfy Equation 2.

[Equation 2]

$$0.8 \leq |Gd/Gq| < 1 \quad (a2)$$

According to means 6, in the field magneton of an embedded magnet type, it is possible to appropriately suppress the circumferential dimensional change of the magnet due to the temperature change while increasing the torque of the rotating electric machine by realizing an orientation that concentrates the magnet magnetic flux on the d-axis.

In means 7 according to any one of means 1 to 6, the magnet is composed of a laminate of a plurality of magnets divided in an axial direction.

According to means 7, when a dimensional change of the magnet occurs due to a change in the temperature of the magnet, the thermal stress between the magnets adjacent to each other in the axial direction tends to increase. In this regard, it is advantageous in that a coefficient of linear expansion in the direction of the axis of easy magnetization is different from the coefficient of linear expansion in the direction perpendicular to the axis of easy magnetization.

In means 8, as the magnet, for example, a sintered neodymium magnet can be used.

Multiple embodiments will be described with reference to the drawings. In some embodiments, parts that are functionally and/or structurally corresponding to each other and/or associated with each other are given the same reference numerals, or reference numerals with different hundred digit or more digits. The corresponding and/or associated parts may refer to the explanation in the other embodiments.

A rotating electric machine according to the embodiments is configured to be used, for example, as a power source for vehicles. The rotating electric machine may, however, be used widely for industrial, automotive, aerial, domestic, office automation, or game applications. Among the following embodiments, the same or equivalent parts are denoted by the same reference numerals in the drawings, and their descriptions will be referred to for the parts of the same reference numerals.

First Embodiment

Figure 2:
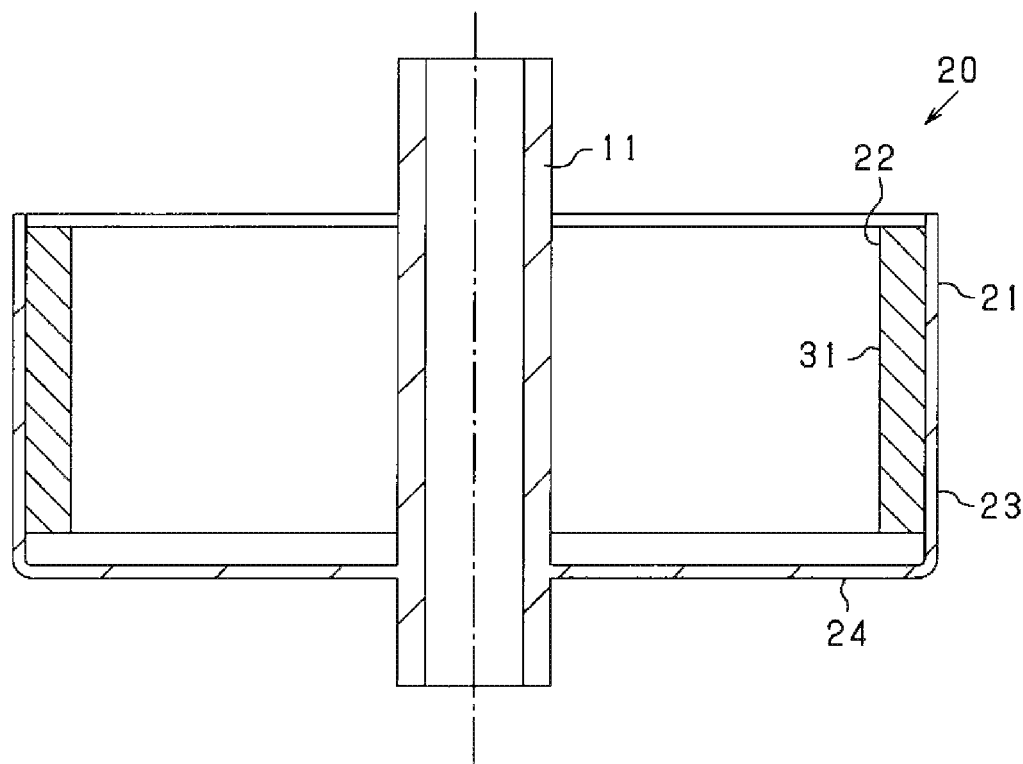
FIG. 2 is a cross-sectional view of a rotor.
Figure 3:
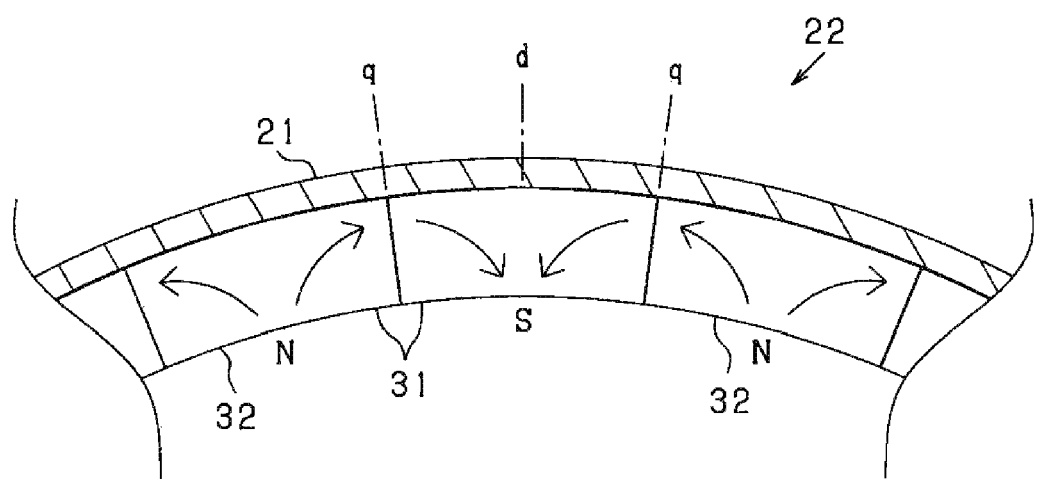
FIG. 3 is a diagram showing a configuration of a magnet.

A rotating electric machine 10 is a synchronous multiphase alternating current (AC) motor and has an outer rotor structure (outer rotating structure). A schema of the rotating electric machine 10 is illustrated in FIGS. 1 to 3. In the following description, in the rotating electric machine 10, a direction in which a rotating shaft 11 extends is defined as an axial direction, a direction radially extending from a center of the rotating shaft 11 is defined as a radial direction, and a direction circumferentially extending around the rotating shaft 11 is defined as a circumferential direction.

The rotating electric machine 10 includes a rotating electric machine main body having a rotor 20 and a stator unit 30, and a housing 40 provided so as to surround the rotating electric machine main body. Each of these members is disposed coaxially with the rotating shaft 11 integrally provided in the rotor 20, and is assembled in an axial direction in a predetermined order to form the rotating electric machine 10. The rotating shaft 11 is supported by a pair of bearings (not shown) provided in the stator unit 30 and the housing 40, respectively, and is rotatable in this state. The rotation of the rotating shaft 11 causes, for example, the axle of a vehicle to rotate. The rotating electric machine 10 can be mounted on a vehicle by fixing the housing 40 to a vehicle body frame or the like.

In the rotating electric machine 10, the stator unit 30 is provided so as to surround the rotating shaft 11, and the rotor 20 is disposed on the outer side of the stator unit 30 in the radial direction. The stator unit 30 includes a stator 50 and a stator holder 60 assembled to the inner side of the stator 50 in the radial direction. The rotor and the stator 50 are disposed to face each other in the radial direction with an air gap interposed therebetween. The rotor 20 rotates integrally with the rotating shaft 11, so that the rotor 20 rotates on the outer side of the stator 50 in the radial direction. In the present embodiment, the rotor 20 corresponds to a "field magneton", and the stator corresponds to an "armature".

Next, a configuration of the stator unit 30 will be described.

The stator unit 30 includes the stator 50 and the stator holder 60 on the inner side of the stator 50 in the radial direction. The stator 50 has a stator winding 51 as an "armature winding" and a stator core 52. The stator holder 60 is made of, for example, a soft magnetic material such as cast iron, or a non-magnetic material such as aluminum or carbon fiber reinforced plastic (CFRP), and has a cylindrical shape.

The stator 50 has, in the axial direction, a portion corresponding to a coil side radially facing the rotor 20 and a portion corresponding to a coil end that is an outer side of the coil side in the axial direction. In this case, the stator core 52 is provided in a range corresponding to the coil side in the axial direction.

The stator winding 51 has a plurality of phase windings. The phase windings of respective phases are disposed in a predetermined order in the circumferential direction to be formed in a cylindrical shape. In the present embodiment, the stator winding 51 has a three-phase windings including the U-phase, the V-phase, and the W-phase windings.

The stator winding 51 of each phase has a conductor portion 53 extending in the axial direction and arranged in a range including the coil side, and a jumper portion connecting the conductor portions 53 of the same phase adjacent to each other in the circumferential direction. FIG. 1 shows an arrangement order of the U-phase, V-phase, and W-phase conductor portions 53U, 53V, and 53W at the coil side.

The stator core 52 is formed as a core sheet stacked body in which core sheets made of a magnetic steel sheet, which is a magnetic member, are stacked in the axial direction. The stator core 52 has a cylindrical shape having a predetermined thickness in the radial direction. The stator winding 51 is assembled to the outer side of the stator core 52 in the radial direction, that is, the rotor 20 side. The outer peripheral surface of the stator core 52 has a curved surface shape without protrusions and recesses. The stator core 52 functions as a back yoke. The stator core 52 is formed by stacking a plurality of core sheets in the axial direction. The core sheet is punched into, for example, an annular plate shape. However, the stator core 52 may have a helical core structure composed of strip-shaped core sheets.

In the present embodiment, the stator 50 has a slot-less structure having no tooth for forming a slot, but the configuration thereof may use any of the following (A) to (C).

(A) The stator 50 includes a conductor-to-conductor member between each adjacent two of the conductor portions 53 in the circumferential direction. As the conductor-to-conductor member, a magnetic material having a relationship of $Wt \times Bs \leq Wm \times Br$ is used, where Wt represents a width dimension in the circumferential direction of the conductor-to-conductor member in one magnetic pole, Bs represents a saturation magnetic flux density of the conductor-to-conductor member, Wm represents a width dimension in the circumferential direction of the magnet 31 in one magnetic pole, and Br represents a residual magnetic flux density of the magnet 31.

(B) The stator 50 includes a conductor-to-conductor member between each adjacent two of the conductor portions 53 in the circumferential direction. A non-magnetic material is used as the conductor-to-conductor member.

(C) The stator 50 does not include a conductor-to-conductor member between each adjacent two of the conductor portions 53 in the circumferential direction.

FIG. 2 is a longitudinal cross-sectional view of the rotor 20. As illustrated in FIG. 2, the rotor 20 includes a substantially cylindrical rotor carrier 21 and an annular magnet unit 22 fixed to the rotor carrier 21. The rotor carrier 21 includes a cylinder 23 having a cylindrical shape and an end plate portion 24 provided at one end of the cylinder 23 in the axial direction. The cylinder 23 and the end plate portion 24 are integrated to form the rotor carrier 21. The rotor carrier 21 functions as a magnet retainer, and the magnet unit 22 is fixed to the inner side of the cylinder 23 in the radial direction to have an annular shape. The rotating shaft 11 is fixed to the end plate portion 24. In the present embodiment, the cylinder 23 is made of a non-magnetic material, and specifically made of, for example, aluminum.

The magnet unit 22 has an annular shape concentric with a rotation center of the rotor 20 and has a plurality of magnets 31 fixed to an inner peripheral surface of the cylinder 23. That is, the rotating electric machine 10 is a surface magnet type synchronous machine (SPMSM). The magnet 31 is provided so as to be surrounded by the cylinder 23 from the outside in the radial direction, and is provided so as to face the coil side of the stator 50 arranged radially inward.

FIG. 3 is a partial transverse sectional view illustrating a sectional structure of the magnet unit 22. In FIG. 3, the direction of the axis of easy magnetization of the magnet 31 is indicated by an arrow.

In the magnet unit 22, the magnets 31 are provided side by side such that the polarities are alternately changed along the circumferential direction of the rotor 20. Thereby, a plurality of magnetic poles are formed in the magnet unit 22 in the circumferential direction. The magnet 31 is a polar anisotropic permanent magnet, and has an intrinsic coercive force of 400 [kA/m] or more and a residual magnetic flux density Br of 1.0 [T] or more.

A peripheral surface of the magnet 31 on the inner side in the radial direction is a magnetic flux acting surface 32 which a magnetic flux is transmitted and received. The magnet unit 22 intensively generates a magnetic flux in a region on or near the d-axis serving as the center of the magnetic pole on the magnetic flux acting surface 32 of the magnet 31. Specifically, in the magnet 31, the directions of the axis of easy magnetization differ between the d-axis side (portion closer to the d-axis) and the q-axis side (portion closer to the q-axis). The direction of the axis of easy magnetization on the d-axis side is parallel to the d-axis, whereas the direction of the axis of easy magnetization on the q-axis side is orthogonal to the q-axis. In this case, an arc-shaped magnetic path is formed along the direction of the axis of easy magnetization. In short, the magnet 31 is oriented so that the direction of the axis of easy magnetization on the d-axis side is closer to the direction of the d-axis side than the direction of the axis of easy magnetization on the q-axis side.

The magnet 31 is a divided magnet having a split surface along the q-axis, and one magnet constitutes one magnetic pole. The magnets 31 adjacent in the circumferential direction are arranged in contact with each other. Since the magnets 31 on both sides across the q-axis attract each other, the magnets 31 can maintain a state where the magnets 31 are in contact with each other. Therefore, this also contributes to improvement of permeance. An adhesive layer made of an adhesive or the like is interposed between the radially outer peripheral surface of the magnet 31 and the radially inner peripheral surface of the cylinder 23. Thereby, the magnet 31 is fixed to the cylinder 23.

Due to temperature changes in the magnets 31, the dimensions of the magnets 31 can change in a circumferential direction. As the temperature of the magnets 31 rises, there is concern about an increase in thermal stress in the direction in which the magnets 31 adjacent to each other in the circumferential direction press against each other. In this case, for example, the magnets 31 may be damaged. In addition, as the temperature of the magnets 31 decreases, there is concern about the occurrence of thermal stress in the direction in which the magnets 31 adjacent to each other in the circumferential direction move apart. In this case, for example, a gap is formed between the adjacent magnets 31, the magnetic resistance of the magnetic circuit increases, and there is concern that the torque of the rotating electric machine 10 will decrease.

Therefore, the engineer of the present disclosure focuses on the coefficient of linear expansion of the magnet 31 to solve the above-described concern, and finds out that the thermal stress applied to the magnet 31 can be reduced.

The coefficient of linear expansion indicates the rate at which the dimensions of an object change in response to changes in the temperature of the object. When the coefficient of linear expansion of an object is positive, the object expands as the temperature rises. On the other hand, when the coefficient of linear expansion of an object is negative, the object contracts as the temperature rises. Some permanent magnets have different coefficients of linear expansion between the direction of the axis of easy magnetization and the direction perpendicular to the axis of easy magnetization.

In the present embodiment, the magnet 31 is a permanent magnet that has different coefficients of linear expansion in the direction of the axis of easy magnetization and in the direction perpendicular to the axis of easy magnetization. Specifically, the magnet 31 is a sintered neodymium magnet having a positive coefficient of linear expansion $\alpha p$ in the direction of the axis of easy magnetization and a negative coefficient of linear expansion $\alpha v$ in the direction perpendicular to the axis of easy magnetization. Therefore, in the magnet 31, the higher the temperature, the larger the dimension in the direction of the axis of easy magnetization, and the smaller the dimension in the direction perpendicular to the axis of easy magnetization. On the other hand, in the magnet 31, the lower the temperature, the smaller the dimension in the direction of the axis of easy magnetization, and the larger the dimension in the direction perpendicular to the axis of easy magnetization.

In the magnet 31, the absolute value of the coefficient of linear expansion $\alpha p$ in the direction of the axis of easy magnetization is made larger than the absolute value of the coefficient of linear expansion $\alpha v$ in the direction perpendicular to the axis of easy magnetization. The coefficient of linear expansion $\alpha p$ in the direction of the axis of easy magnetization is, for example, 5.5 to 7.5 ppm/° C., and the coefficient of linear expansion $\alpha v$ in the direction perpendicular to the axis of easy magnetization is, for example, −3.0 to −0.5 ppm/° C. The absolute value of the coefficient of linear expansion $\alpha p$ in the direction of the axis of easy magnetization is, for example, 2 to 15 times, 5 to 15 times, 8 to 15 times, 10 to 15 times, 8-13 times or 10-13 times the absolute value of the coefficient of linear expansion $\alpha v$ in the direction perpendicular to the axis of easy magnetization.

Figure 4:
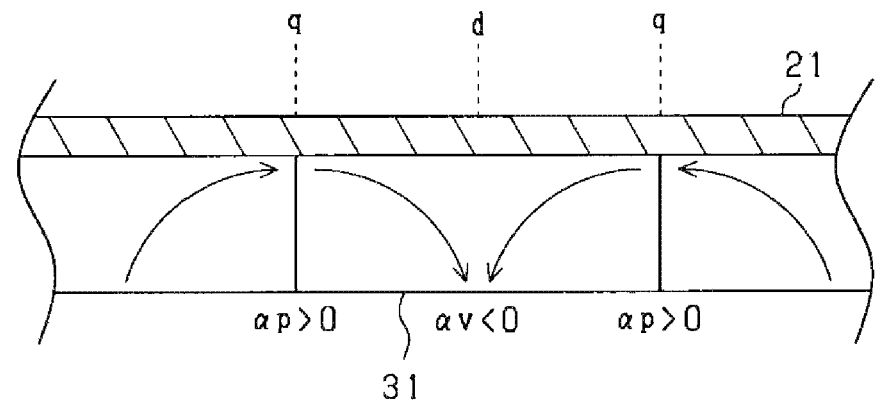
FIG. 4 is a diagram of a magnet unit developed in a circumferential direction.

FIG. 4 shows the magnet unit 22 developed linearly in the circumferential direction. On the d-axis side, the axis of easy magnetization of the magnet 31 approaches the direction perpendicular to the circumferential direction, so the coefficient of linear expansion of the magnet 31 in the circumferential direction becomes $\alpha v$ (<0). On the q-axis side, the axis of easy magnetization of the magnet 31 approaches the circumferential direction, so the coefficient of linear expansion of the magnet 31 in the circumferential direction becomes $\alpha p$ (>0). As a result, the higher the temperature of the magnet 31, the smaller the dimension of the magnet 31 on the d-axis side and the larger the dimension of the magnet 31 on the q-axis side in the circumferential direction. On the other hand, the lower the temperature of the magnet 31, the larger the dimension of the magnet 31 on the d-axis side and the smaller the dimension of the magnet 31 on the q-axis side in the circumferential direction. Therefore, it is possible to suppress the change in the dimension of the magnet 31 as a whole in the circumferential direction. As a result, the thermal stress in the direction in which the magnets 31 adjacent in the circumferential direction press each other and the thermal stress in the direction in which the magnets 31 adjacent in the circumferential direction separate can be suppressed. As a result, damage to the magnet 31 and an increase in magnetic resistance can be suppressed.

Here, in the d-axis portion of the magnet 31, the amount of dimensional reduction in the circumferential direction when the temperature rises by a unit temperature is defined as Fd. In the q-axis portion of the magnet 31, the dimensional increase in the circumferential direction when the temperature rises by the above unit temperature is referred to as Fq. In this case, the direction of the axis of easy magnetization on the d-axis side is closer to the direction of the d-axis side than the direction of the axis of easy magnetization on the q-axis side, and it is desirable that the magnet 31 is oriented so as to satisfy Equation 3 below.

[Equation 3]

$$0.8 \leq |Fd/Fq| < 1 \tag{a3}$$

As a result, it is possible to appropriately suppress the circumferential dimensional change of the magnet 31 due to the temperature change while increasing the torque of the rotating electric machine 10 by realizing an orientation that concentrates the magnet magnetic flux on the d-axis. The ratio represented by |Fd/Fq| is, for example, desirably 0.9 or more and less than 1, and more desirably 0.95 or more and less than 1.

Figure 5:
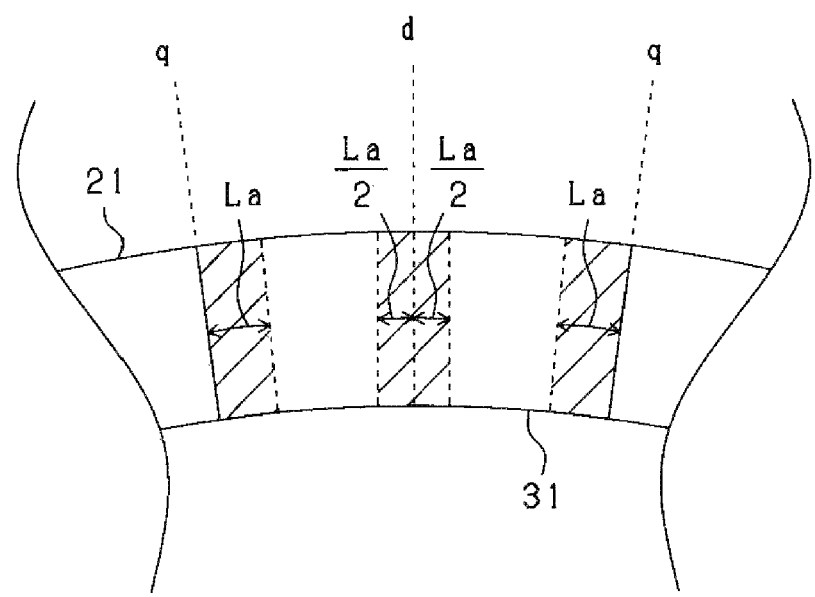
FIG. 5 is a diagram showing a specified length.

As shown in FIG. 5, the q-axis portion of the magnet 31 is, for example, a portion from the plane split by the q-axis of the magnet 31 to a specific position toward the d-axis in the circumferential direction, and is a portion from the surface split by the q-axis to the specified length La in the circumferential direction. The specified length La is, for example, ⅛ to ¼ of the circumferential length of the magnet 31 at the center position in the radial direction.

Fq is, for example, the amount of change in the circumferential length at the radial center position of the q-axis portion of the magnet 31, or the average value of the amount of change in the circumferential length at each of a plurality of positions in the radial direction on the q-axis portion.

As shown in FIG. 5, the d-axis portion of the magnet 31 is, for example, a portion of the magnet 31 that straddles the d-axis and includes a portion from the d-axis to La/2 toward one split surface in the circumferential direction and a portion from the d-axis to La/2 toward the other split surface in the circumferential direction.

Fd is, for example, the amount of change in the circumferential length at the radial center position of the d-axis portion of the magnet 31, or the average value of the amount of change in the circumferential length at each of a plurality of positions in the radial direction on the d-axis portion.

Second Embodiment

Figure 6:
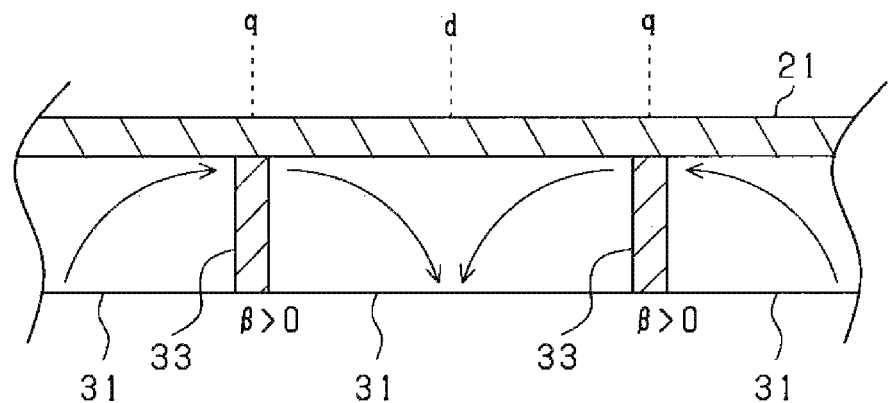
FIG. 6 is a diagram of the magnet unit according to a second embodiment developed in the circumferential direction.

Hereinafter, a second embodiment will be described with reference to the drawings, focusing on differences from the first embodiment. In the present embodiment, as shown in FIG. 6, the rotor 20 has a q-axis side protrusion 33 that protrudes radially inward from a portion of the rotor carrier 21 that straddles the q-axis. The q-axis side protrusion 33 abuts on a split surface provided on the q-axis side of the magnet 31, and is used, for example, for positioning the magnet 31 in the circumferential direction. FIG. 6 shows an example in which the dimension of the q-axis side protrusion 33 and the dimension of the magnet 31 are the same in the radial direction. In addition, FIG. 6 shows the magnet unit 22 developed linearly in the circumferential direction. Moreover, as the magnet 31, the same one as in the first embodiment can be used.

In the present embodiment, the q-axis side protrusion 33 is made of a soft magnetic material such as cast iron, and the coefficient of linear expansion 13 of the q-axis side protrusion 33 is a positive value in any direction. Therefore, in the q-axis side protrusion 33, the higher the temperature, the larger the circumferential dimension of the q-axis side protrusion 33, and the lower the temperature, the smaller the circumferential dimension of the q-axis side protrusion 33.

In the present embodiment, the magnets 31 adjacent in the circumferential direction are arranged with the q-axis side protrusion 33 interposed therebetween. In this case, when the magnet 31 and the q-axis side protrusion 33 change in dimension in the circumferential direction due to a change in the temperature of the magnet 31 and the q-axis side protrusion 33, the thermal stress tends to increase in either the direction in which the magnet 31 and the q-axis side protrusion 33 are pressed against each other or the direction in which the magnet 31 and the q-axis side protrusion 33 move away from each other. In this regard, in the magnet 31, there is a great advantage in applying the configuration of the present embodiment in which the coefficient of linear expansion $\alpha p$ in the direction of the axis of easy magnetization is positive and the coefficient of linear expansion $\alpha v$ in the direction perpendicular to the axis of easy magnetization is negative.

The q-axis side protrusion 33 may be integrated with the rotor carrier 21 or may be a separate member from the rotor carrier 21.

Third Embodiment

Hereinafter, a third embodiment will be described with reference to the drawings, focusing on differences from the first embodiment. In the present embodiment, the magnet 31 has a split surface on the d-axis side.

Figure 7:
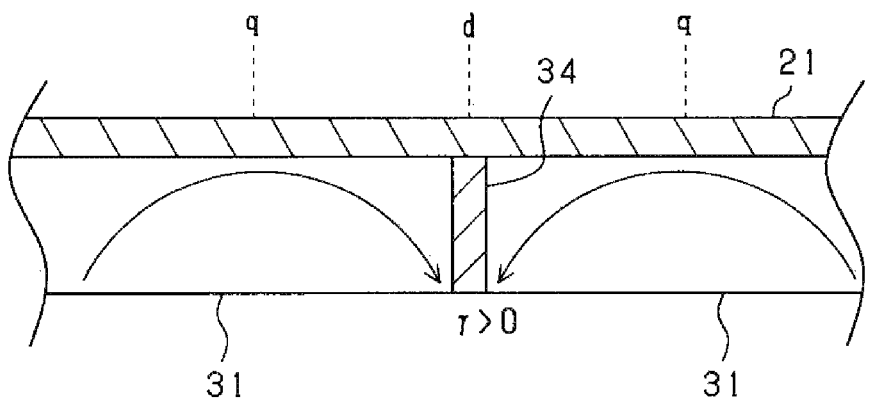
FIG. 7 is a diagram of the magnet unit according to a third embodiment developed in the circumferential direction.

FIG. 7 shows the magnet unit 22 developed linearly in the circumferential direction. The rotor 20 has a d-axis side protrusion 34 that protrudes radially inward from a portion of the rotor carrier 21 that straddles the d-axis. The d-axis side protrusion 34 abuts on a split surface provided on the d-axis side of the magnet 31 and is used for positioning the magnet 31 in the circumferential direction. FIG. 7 shows an example in which the dimension of the d-axis side protrusion 34 and the dimension of the magnet 31 are the same in the radial direction.

The coefficient of linear expansion $\gamma$ of the d-axis side protrusion 34 is a positive value in any direction. Therefore, in the d-axis side projection 34, the higher the temperature, the larger the circumferential dimension of the d-axis side projection 34, and the lower the temperature, the smaller the circumferential dimension of the d-axis side projection 34. The d-axis side protrusion 34 is made of, for example, a soft magnetic material such as cast iron or a non-magnetic material such as synthetic resin. Moreover, as the magnet 31, the same one as in the first embodiment can be used.

In the present embodiment, the magnets 31 adjacent in the circumferential direction are arranged with the d-axis side protrusion 34 interposed therebetween. In this case, when the temperature of the magnet 31 and the d-axis side protrusion 34 increases, the dimension of the d-axis side magnet 31 decreases and the dimension of the d-axis side protrusion 34 increases in the circumferential direction. On the other hand, when the temperature of the magnet 31 and the d-axis side protrusion 34 decreases, the dimension of the d-axis side magnet 31 increases and the dimension of the d-axis side protrusion 34 decreases in the circumferential direction. Thereby, it is possible to suitably suppress the dimensional change in the circumferential direction of the magnet 31 and the d-axis side protrusion 34 in the vicinity of the d-axis.

Fourth Embodiment

Hereinafter, a fourth embodiment will be described with reference to the drawings, focusing on differences from the first embodiment. The rotating electric machine of the present embodiment is an IPM motor with an inner rotor structure (inner rotation structure).

Figure 8:
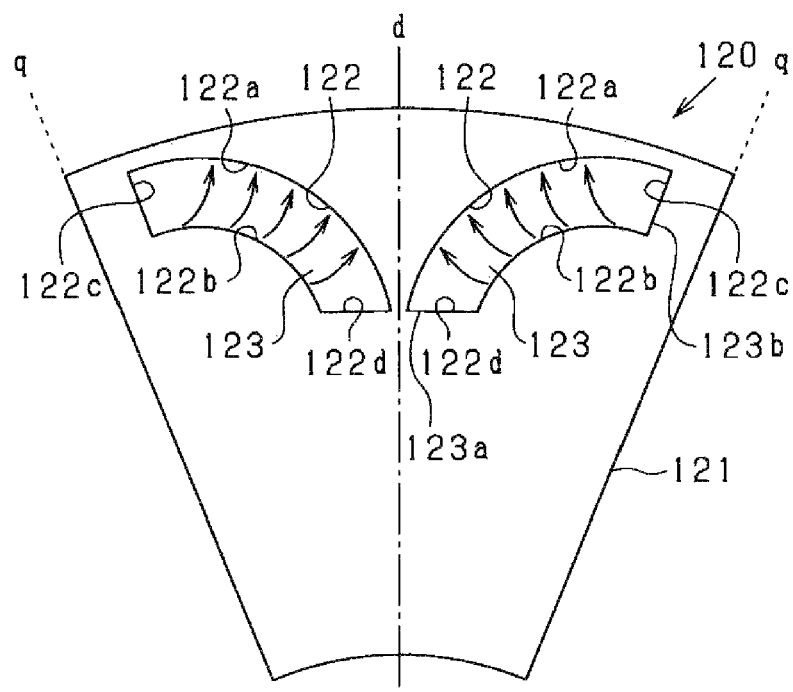
FIG. 8 is a cross-sectional view of a rotor according to a fourth embodiment.

FIG. 8 shows a partial cross-sectional view of rotor 120 that constitutes the rotating electric machine.

The rotor 120 includes a rotor core 121 (corresponding to a "field magneton core") fixed to a rotating shaft (not shown). A plurality of magnet housing holes 122 arranged in the circumferential direction are formed in the rotor core 121, and a magnet 123 (permanent magnet) is embedded in each magnet housing hole 122.

The rotor core 121 is formed with a pair of arcuate (arched) magnet housing holes 122. The pair of magnet housing holes 122 are formed in a substantially V shape so that the distance between them increases toward the outer peripheral side, and the pair of magnet housing holes 122 are symmetrical with respect to the d-axis.

The magnet housing hole 122 is formed by being surrounded by arc-shaped curved surfaces 122a and 122b equidistantly spaced from each other and flat connecting surfaces 122c and 122d connecting both ends of the curved surfaces 122a and 122b. Of the connecting surfaces 122c and 122d, the connecting surface 122c closer to the q-axis is provided parallel to the q-axis. Also, the connecting surface 122d near the d-axis is provided so as to be perpendicular to the d-axis.

The magnet 123 having the same shape as the hole is inserted into the magnet housing hole 122. In this case, one magnetic pole is formed by a pair of magnets 123 housed in a pair of magnet housing holes 122. The magnet 123 has an end 123a and an end 123b longitudinally opposed each other, and the axis of easy magnetization of the magnet 123 is indicated by an arrow. From the end 123b close to the q-axis toward the end 123a close to the d-axis at both ends 123a, 123b, the magnet 123 is provided so that the axis of easy magnetization is switches non-linearly convex to the opposite side of the stator so that the direction close to the direction perpendicular to the q-axis becomes the direction close to the direction parallel to the d-axis. In other words, the magnet magnetic path in the magnet 123 is determined in a direction transverse to the magnet 123 and has an arcuate shape that is convex toward the central axis of the rotor core 121.

Since the axis of easy magnetization of the magnet 123 is determined in this way, in the magnet 123, the axis of easy magnetization is nearly perpendicular to the q-axis at the end 123b near the q-axis of the magnet 123, and nearly parallel to the d-axis at the end 123a near the d-axis.

The magnet 123 is a sintered neodymium magnet as in the first embodiment. Also, as in the first embodiment, in the magnet 123, the absolute value of the coefficient of linear expansion in the direction of the axis of easy magnetization is made larger than the absolute value of the coefficient of linear expansion in the direction perpendicular to the axis of easy magnetization.

In the d-axis portion of the magnet 123, the amount of dimensional reduction in the longitudinal direction when the temperature rises by a unit temperature is referred to as Gd. In the q-axis portion of the magnet 123, the dimensional increase in the longitudinal direction when the temperature rises by a unit temperature is referred to as Gq. In this case, the direction of the axis of easy magnetization on the d-axis side is closer to the direction of the d-axis side than the direction of the axis of easy magnetization on the q-axis side, and it is desirable that the magnet 123 is oriented so as to satisfy Equation 4 below.

[Equation 4]

$$0.8 \leq |Gd/Gq| < 1 \tag{a4}$$

As a result, it is possible to appropriately suppress the dimensional change in the longitudinal direction of the magnet 123 due to the temperature change while increasing the torque of the rotating electric machine by realizing an orientation that concentrates the magnet magnetic flux on the d-axis. The ratio represented by |Gd/Gq| is, for example, desirably 0.9 or more and less than 1, and more desirably 0.95 or more and less than 1.

Figure 9:
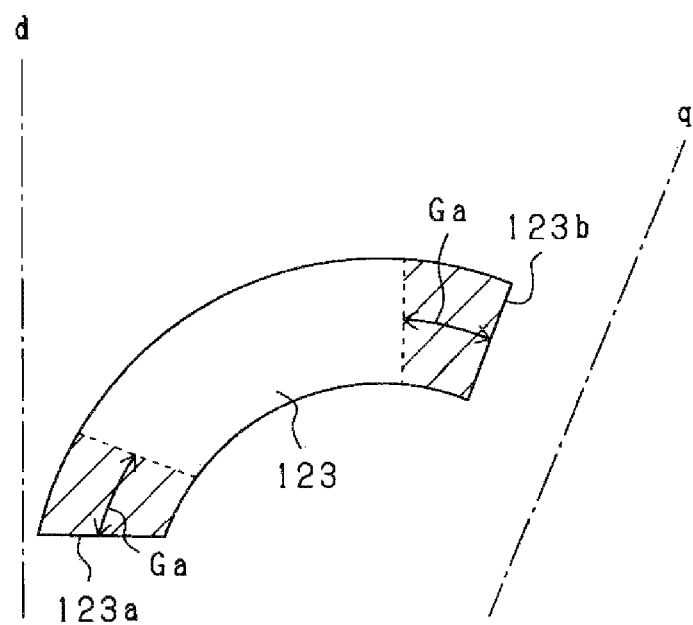
FIG. 9 is a diagram showing a specified length.

As shown in FIG. 9, the q-axis portion of the magnet 123 is, for example, a portion of the magnet 123 from the end 123b on the q-axis side to a specific position toward the end 123a on the d-axis side in the longitudinal direction, and is a portion from the end 123b on the q-axis side to a specified length Ga in the longitudinal direction. The specified length Ga is, for example, ⅛ to ¼ of the circumferential length of the magnet 123 at the center position in the radial direction.

Gq is, for example, the amount of change in the circumferential length at the radial center position of the q-axis portion of the magnet 123, or the average value of the amount of change in the circumferential length at each of a plurality of positions in the radial direction on the q-axis portion.

As shown in FIG. 9, the d-axis portion of the magnet 123 is, for example, a portion of the magnet 123 from the end 123a on the d-axis side to a specific position toward the end 123b on the q-axis side in the longitudinal direction, and is a portion from the end 123a on the d-axis side to the specified length Ga in the longitudinal direction.

Gd is, for example, the amount of change in the circumferential length at the radial center position of the d-axis portion of the magnet 123, or the average value of the amount of change in the circumferential length at each of a plurality of positions in the radial direction on the d-axis portion.

Other Embodiments

The above embodiments may be changed and carried out as follows.

Figure 10:
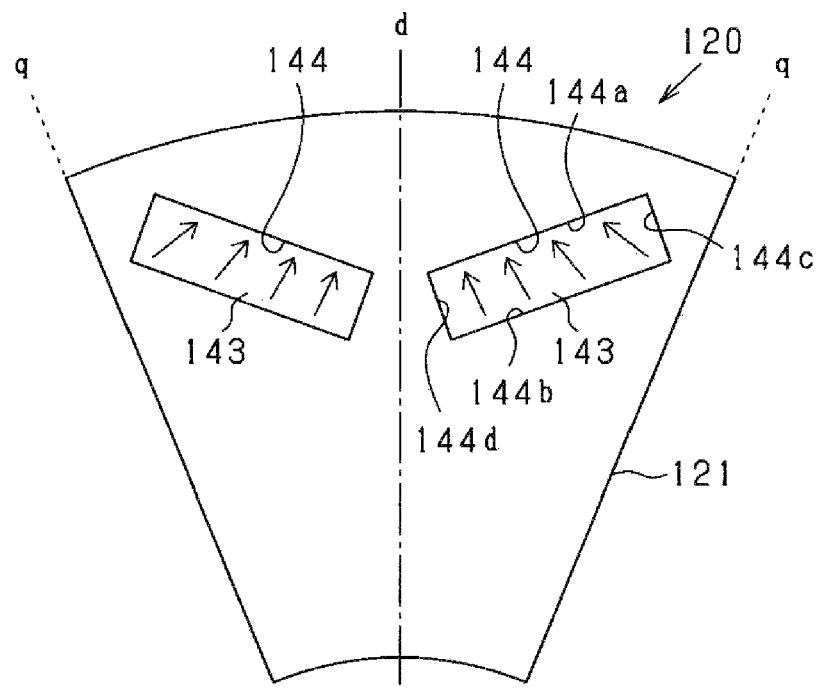
FIG. 10 is a cross-sectional view of a rotor according to another embodiment.

As the rotor 120, the configuration shown in FIG. 10, for example, may be used instead of the configuration shown in FIG. 8 of the fourth embodiment.

As shown in FIG. 10, the transverse cross sections (perpendicular to the axial direction) of the magnet housing hole 144 formed in the rotor core 121 and the magnet 143 accommodated therein are rectangular other than arcuate. The magnet housing hole 144 is formed by being surrounded by flat surfaces 144a and 144b equidistantly spaced from each other and connecting surfaces 144c and 144d connecting both ends of the flat surfaces 144a and 144b to each other. In the cross section of the rotor 120, the magnet housing holes 144 are rectangular with long sides extending from the d-axis side to the q-axis side. Furthermore, a pair of the magnet housing holes 144 and the magnets 143 symmetrical with respect to the d-axis are arranged in a V shape respectively.

In the magnet 143, the axis of easy magnetization at the position near the end on the d-axis side is made different from the axis of easy magnetization at the position near the end on the q-axis side. That is, in the magnet 143, the magnetization direction is made different between the portion closer to the d-axis and the portion closer to the q-axis. In this case, in the magnet 143, the axis of easy magnetization at the position closer to the end on the d-axis side is closer to parallel to the d-axis than the axis of easy magnetization at the position closer to the end on the q-axis side.

Figure 11:
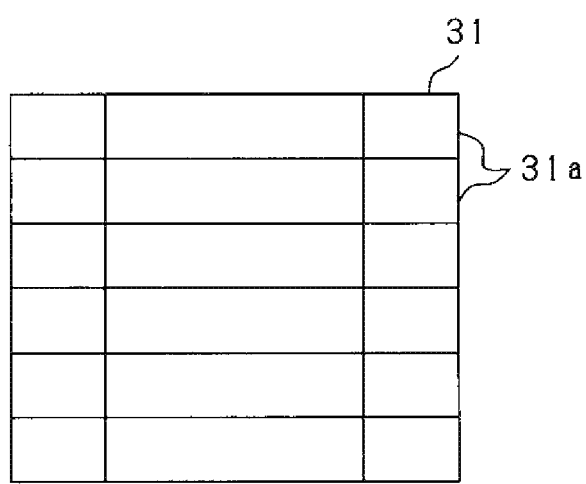
FIG. 11 is a diagram illustrating axially stacked magnets according to another embodiment.

As shown in FIG. 11, the magnet 31 may be composed of a plurality of magnets 31a divided in the axial direction. That is, the magnet 31 may be configured by a laminate of a plurality of magnets 31a. The magnet 31a has a pair of parallel flat surfaces facing each other in the axial direction. The laminate of the plurality of magnets 31a is integrated by fixing with an adhesive agent or the like in a state where the flat surfaces adjacent to each other in the axial direction are in contact with each other. In this case, the thermal stress between divided magnets adjacent to each other in the axial direction tends to increase in the circumferential direction. In this regard, there is a great advantage in applying the configuration of the present embodiment in which the coefficient of linear expansion $\alpha p$ in the direction of the axis of easy magnetization is positive and the coefficient of linear expansion $\alpha v$ in the direction perpendicular to the axis of easy magnetization is negative.

In the first embodiment, the magnet 31 in which the coefficient of linear expansion $\alpha p$ in the direction of the axis of easy magnetization is positive and the coefficient of linear expansion $\alpha v$ in the direction perpendicular to the axis of easy magnetization is negative is used, however, the magnet 31 is not limited to this configuration. For example, in the magnet 31, both of the coefficient of linear expansion $\alpha p$ in the direction of the axis of easy magnetization and the coefficient of linear expansion $\alpha v$ in the direction perpendicular to the axis of easy magnetization may be positive, and the absolute value of the coefficient of linear expansion $\alpha v$ in the direction perpendicular to the axis of easy magnetization and the absolute value of the coefficient of linear expansion $\alpha p$ in the direction of the axis of easy magnetization may be different. Such magnets include, for example, samarium-cobalt magnets or ferrite magnets. Even in this case, it is possible to suppress the change in the dimension of the magnet 31 in the circumferential direction.

Although the dimension of the q-axis side protrusion 33 and the dimension of the d-axis side protrusion 34 are set to be the same as the dimension of the magnet 31 in the radial direction, the above dimension is not limited to this configuration. The dimension of the q-axis side protrusion 33 and the dimension of the d-axis side protrusion 34 may be smaller than the dimension of the magnet 31 in the radial direction.

Figure 12:
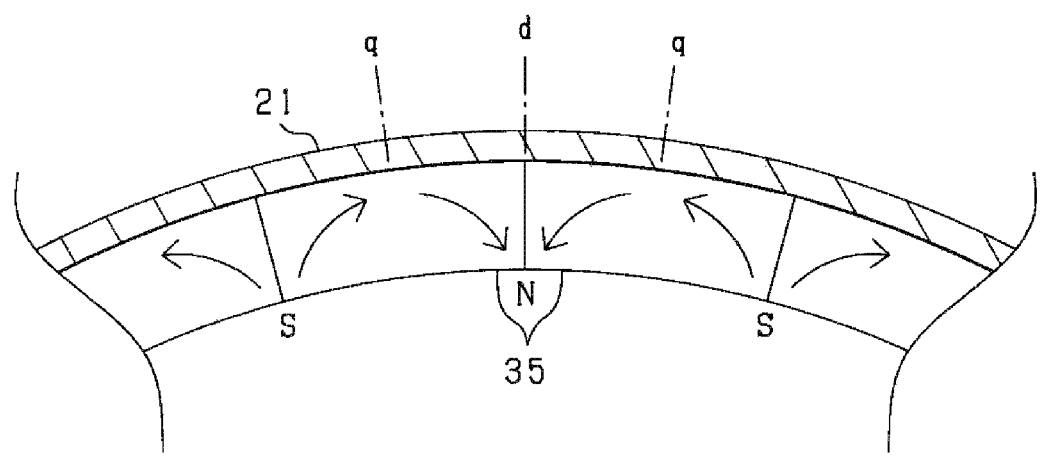
FIG. 12 is a diagram showing the configuration of a magnet according to another embodiment.
Figure 13:
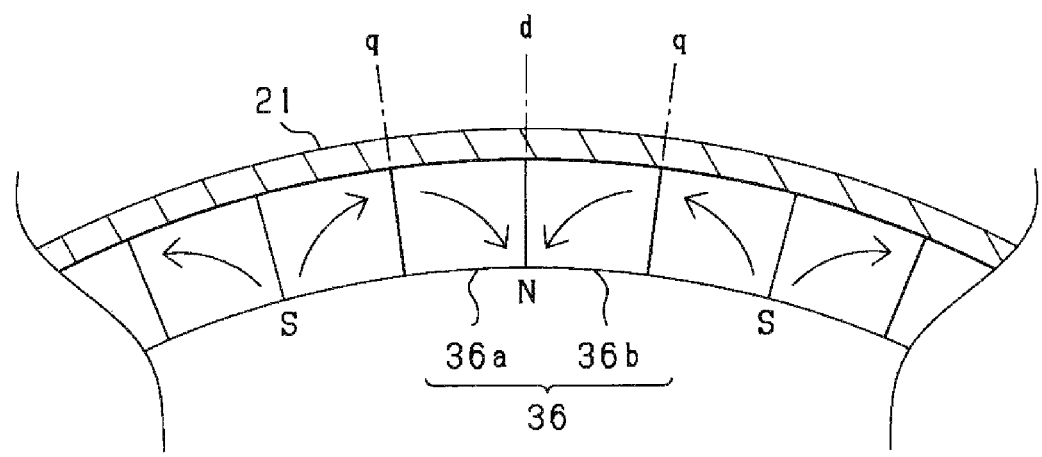
FIG. 13 is a diagram showing the configuration of a magnet according to other embodiment.

In the first embodiment, the magnet may be, for example, a magnet 35 having a split surface on the d-axis as shown in FIG. 12, or a magnet 36 having a split surface on the d-axis in addition to a split surface on the q-axis as shown in FIG. 13. The magnet 36 shown in FIG. 13 constitutes one magnetic pole with two magnets 36a and 36b arranged in the circumferential direction.

When the magnet 35 has the split surface on the d-axis as shown in FIG. 12, the d-axis portion of the magnet 35 is, for example, a portion of the magnet 35 extending from the split surface on the d-axis to the q-axis in the circumferential direction and extending from the split surface on d-axis to the specified length La in the circumferential direction.

Fd is, for example, the amount of change in the circumferential length at the radial center position of the d-axis portion of the magnet 35, or the average value of the amount of change in the circumferential length at each of a plurality of positions in the radial direction on the q-axis portion.

When the magnet 35 has the split surface on d-axis as shown in FIG. 12, the q-axis portion of the magnet 35 is, for example, a portion of the magnet 35 that straddles the q-axis and includes a portion from the q-axis to La/2 toward one split surface in the circumferential direction and a portion from the q-axis to La/2 toward the other split surface in the circumferential direction.

Fq is, for example, the amount of change in the circumferential length at the radial center position of the q-axis portion of the magnet 35, or the average value of the amount of change in the circumferential length at each of a plurality of positions in the radial direction on the q-axis portion.

Taking the magnet 36a shown in FIG. 13 as an example, the q-axis portion of the magnet 36a is, for example, a portion from the plane split by the q-axis of the magnet 36a toward the d-axis in the circumferential direction, and is a portion from the surface split by the q-axis to La/2 in the circumferential direction.

Fq is, for example, the amount of change in the circumferential length at the radial center position of the q-axis portion of the magnet 36a, or the average value of the amount of change in the circumferential length at each of a plurality of positions in the radial direction on the q-axis portion.

Taking the magnet 36a shown in FIG. 13 as an example, the d-axis portion of the magnet 36a is, for example, a portion from the plane split by the d-axis of the magnet 36a toward the q-axis in the circumferential direction, and is a portion from the surface split by the d-axis to La/2 in the circumferential direction.

Fd is, for example, the amount of change in the circumferential length at the radial center position of the d-axis portion of the magnet 36a, or the average value of the amount of change in the circumferential length at each of a plurality of positions in the radial direction on the d-axis portion.

Moreover, the positions of dividing the magnet in the circumferential direction are not limited to the positions shown in FIGS. 12 and 13, and may be any positions. The number of divisions in the magnet in the circumferential direction can be increased within the range in which the magnet can be manufactured. Moreover, the magnet is not limited to those divided in the circumferential direction, and an annular magnet may be used.

The rotating electric machine is not limited to the one having the slotless structure, and may be one having teeth.

Of the field element and the armature, the rotating electric machine is not limited to the rotating electric machine in which the field element is the rotor, and may be the rotating electric machine in which the armature is the rotor.

The disclosure in the present specification is not limited to the illustrated embodiments. The disclosure encompasses the illustrated embodiments and modifications based on the embodiments by those skilled in the art. For example, the disclosure is not limited to the combinations of components and/or elements shown in the embodiments. The disclosure may be implemented in various combinations. The disclosure may have additional portions that may be added to the embodiments. The disclosure encompasses omission of components and/or elements of the embodiments. The disclosure encompasses the replacement or combination of components and/or elements between one embodiment and another. The disclosed technical scope is not limited to the description of the embodiments. The several technical ranges disclosed are indicated by the description of the claims, and should be construed to include all modifications within the meaning and range equivalent to the description of the claims.

While the present disclosure has been described with reference to embodiments thereof, it is to be understood that the disclosure is not limited to the embodiments and constructions. The present disclosure encompasses various modifications and variations within the scope of equivalents. In addition, while the various combinations and configurations, which are preferred, other combinations and configurations, including more, less or only a single element, are also within the spirit and scope of the present disclosure.

What is claimed is:

1. A field magneton constituting a rotating electric machine including an armature having an armature winding, and arranged radially facing the armature, comprising:
   a magnet having a plurality of magnetic poles with alternating polarities in a circumferential direction, wherein
   the magnet is oriented so that a direction of an axis of easy magnetization on a d-axis side, which is a magnetic pole center, is closer to a direction of the d-axis than the direction of the axis of easy magnetization on a q-axis side, which is a magnetic pole boundary,
   in the magnet, a coefficient of linear expansion in the direction of the axis of easy magnetization is positive and the coefficient of linear expansion in the direction perpendicular to the axis of easy magnetization is negative, and an absolute value of the coefficient of linear expansion in the direction perpendicular to the axis of easy magnetization is larger than the absolute value of the coefficient of linear expansion in the direction of the axis of easy magnetization,
   an amount of dimensional change in the circumferential direction per unit temperature change in a d-axis portion of the magnet is referred to as Fd,
   an amount of dimensional change in the circumferential direction per unit temperature change in a q-axis portion of the magnet is referred to as Fq, and
   a direction of the axis of easy magnetization on the d-axis side is closer to the direction of the d-axis side than the direction of the axis of easy magnetization on the q-axis side, and the magnet is oriented so as to satisfy Equation 1.

$0.81 \leq |Fd/Fq| < 1$ (Equation 1).

2. The field magneton according to claim 1, wherein
   the field magneton is a surface magnet type including a magnet carrier having a peripheral surface to which the magnets are attached,
   the magnet has a plurality of divided magnets divided in the circumferential direction, and
   a split surface of each of the divided magnets adjacent in the circumferential direction is in contact with each other.

3. The field magneton according to claim 1, wherein
   the field magneton is a surface magnet type including a magnet carrier having a peripheral surface to which the magnets are attached,
   the magnet has a plurality of divided magnets divided in the circumferential direction,
   a protrusion protruding radially from a magnet carrier toward the armature side and having a positive coefficient of linear expansion is provided, and
   an end in the circumferential direction of the divided magnet is in contact with the protrusion.

4. The field magneton according to claim 1, wherein
   the magnet is composed of a laminate of a plurality of magnets divided in an axial direction.

5. The field magneton according to claim 1, wherein
   the magnet is a sintered neodymium magnet.

6. A field magneton constituting a rotating electric machine including an armature having an armature winding, and arranged radially facing the armature, comprising:
   a magnet having a plurality of magnetic poles with alternating polarities in a circumferential direction; and
   a field magneton core, wherein
   the field magneton is an embedded magnet type field magneton in which the magnet is housed in a magnet housing hole formed in the field magneton core,
   the magnet is oriented so that a direction of an axis of easy magnetization on a d-axis side, which is a magnetic pole center, is closer to a direction of the d-axis than the direction of the axis of easy magnetization on a q-axis side, which is a magnetic pole boundary,
   the magnet housing hole and the magnet extends lengthwise from the d-axis side toward the q-axis side,
   in the magnet, a coefficient of linear expansion in the direction of the axis of easy magnetization is positive and the coefficient of linear expansion in the direction perpendicular to the axis of easy magnetization is negative, and an absolute value of the coefficient of linear expansion in the direction perpendicular to the axis of easy magnetization is larger than the absolute value of the coefficient of linear expansion in the direction of the axis of easy magnetization,
   an amount of dimensional change in the longitudinal direction per unit temperature change in a d-axis portion of the magnet is referred to as Gd,
   an amount of dimensional change in the longitudinal direction per unit temperature change in a q-axis portion of the magnet is referred to as Gq, and
   a direction of the axis of easy magnetization on the d-axis side is closer to the direction of the d-axis side than the direction of the axis of easy magnetization on the q-axis side, and the magnet is oriented so as to satisfy Equation 2.

$0.8 \leq |Gd/Gq| < 1$ (Equation 2).

7. The field magneton according to claim 6, wherein
   the magnet is composed of a laminate of a plurality of magnets divided in an axial direction.

8. The field magneton according to claim 6, wherein
   the magnet is a sintered neodymium magnet.

* * * * *